(«12») United States Patent
Nonoyama

(10) Patent No.: US 10,249,190 B2
(45) Date of Patent: Apr. 2, 2019

(54) VEHICULAR DISPLAY CONTROL APPARATUS AND VEHICULAR DISPLAY CONTROL METHOD

(71) Applicant: DENSO CORPORATION, Kariya, Aichi-pref. (JP)

(72) Inventor: Yuji Nonoyama, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 52 days.

(21) Appl. No.: 15/527,881

(22) PCT Filed: Dec. 8, 2015

(86) PCT No.: PCT/JP2015/006104
§ 371 (c)(1),
(2) Date: May 18, 2017

(87) PCT Pub. No.: WO2016/092825
PCT Pub. Date: Jun. 16, 2016

(65) Prior Publication Data
US 2018/0012489 A1 Jan. 11, 2018

(30) Foreign Application Priority Data
Dec. 12, 2014 (JP) ................................ 2014-252261

(51) Int. Cl.
G08G 1/0967 (2006.01)
B60K 35/00 (2006.01)
(Continued)

(52) U.S. Cl.
CPC ........... *G08G 1/0967* (2013.01); *B60K 35/00* (2013.01); *G08G 1/09* (2013.01); *G08G 1/09623* (2013.01);
(Continued)

(58) Field of Classification Search
CPC ... G08G 1/0967; G08G 1/09623; B60K 35/00
See application file for complete search history.

(56) References Cited

U.S. PATENT DOCUMENTS

2009/0066539 A1 3/2009 Uemura et al.
2011/0090076 A1 4/2011 Nakamura

FOREIGN PATENT DOCUMENTS

JP 2005-135262 5/2005
JP 2005-182191 A 7/2005
(Continued)

*Primary Examiner* — Basil T. Jos
(74) *Attorney, Agent, or Firm* — Knobbe, Martens, Olson & Bear, LLP

(57) ABSTRACT

A vehicular display control apparatus includes: a condition determination portion that determines whether a deviation prediction condition has been established, the deviation prediction condition being a condition based on which a deviation between a sensible speed for a driver and an actual traveling speed is predicted; a speed difference determination portion that determines whether a speed difference between the actual traveling speed and a speed limit is a switching determination value or larger, and whether a shortage of the traveling speed from the speed limit is the switching determination value or larger; and a switching control portion that switches a speed display indicating the traveling speed to an emphasized display in a case when the condition determination portion determines that the deviation prediction condition has been established, and also when the speed difference determination portion determines that the speed difference is the switching determination value or larger.

16 Claims, 14 Drawing Sheets

(51) Int. Cl.
*G08G 1/0962* (2006.01)
*G08G 1/09* (2006.01)
*G08G 1/16* (2006.01)
*B60R 21/00* (2006.01)

(52) U.S. Cl.
CPC ........ *G08G 1/16* (2013.01); *B60K 2350/1076* (2013.01); *B60K 2350/352* (2013.01); *B60K 2350/962* (2013.01); *B60K 2350/965* (2013.01); *B60R 21/00* (2013.01)

(56) References Cited

FOREIGN PATENT DOCUMENTS

| | | |
|---|---|---|
| JP | 2006-035951 A | 2/2006 |
| JP | 2012-040965 A | 3/2012 |
| JP | 2014-032071 | 2/2014 |

FIG. 5

| CONDITION | DETAIL |
|---|---|
| Cd1 | TRAVELLING ROAD IS SWITCHED FROM HIGHWAY TO ORDINARY ROAD |
| Cd2 | TRAVELLING ROAD IS SWITCHED FROM OUTSIDE TO INSIDE OF TUNNEL |
| Cd3 | TRAVELLING ROAD IS SLOPE |
| Cd4 | TRAVELLING TIME ZONE IS NIGHT TIME |

FIG. 6

| CONDITION | DETAIL |
|---|---|
| Cr1 | CANCELLATION PREDICTION TIME ELAPSES FROM TIME WHEN DEVIATION PREDICTION CONDITION IS ESTABLISHED |
| Cr2 | TRAVELING STATE OF SUBJECT VEHICLE FOLLOWS TRAVELING FLOW OF DIFFERENT VEHICLE AFTER DEVIATION PREDICTION CONDITION IS ESTABLISHED |
| Cr3 | TEMPORARY STOP OF SUBJECT VEHICLE IS MADE AFTER DEVIATION PREDICTION CONDITION IS ESTABLISHED |

VEHICULAR DISPLAY CONTROL APPARATUS AND VEHICULAR DISPLAY CONTROL METHOD

CROSS REFERENCE TO RELATED APPLICATIONS

The present application is based on Japanese Patent Application No. 2014-252261 filed on Dec. 12, 2014, the disclosures of which is incorporated herein by reference.

TECHNICAL FIELD

The present disclosure relates to a vehicular display control apparatus and a vehicular display control method, which control display of a display unit of a vehicle.

BACKGROUND ART

It has been known that a deviation may be produced between a sensible speed for a driver of a vehicle during traveling of the vehicle and an actual traveling speed of the vehicle. For example, a deviation between the traveling speed and the sensible speed may be easily produced when a traveling road of the vehicle switches to an ordinary road from a highway allowing a higher legal speed limit than that of the ordinary road.

In order to secure safe traveling of the subject vehicle even under such a deviation, a technology disclosed in Patent Literature 1 forcedly reduces a traveling speed of the subject vehicle to a speed limit or lower through control of driving force of the subject vehicle to assist safe driving.

PRIOR ART LITERATURE

Patent Literature

Patent Literature 1: JP 2006-35951 A

SUMMARY OF INVENTION

According to the technology disclosed in Patent Literature 1, the traveling speed is forcedly reduced by automatic intervention of driving force control. In this case, a driver may feel uncomfortable by the forced speed reduction not intended by the driver.

It is an object of the present disclosure to provide a vehicular display control apparatus and a vehicular display control method capable of reducing an uncomfortable feeling which a driver may have, by assisting safe traveling of a vehicle.

According to one example of the present disclosure, a vehicular display control apparatus controlling a display made by a display unit of a subject vehicle is provided. The vehicular display control apparatus includes: a condition determination portion that determines whether a deviation prediction condition has been established for the subject vehicle, the deviation prediction condition being a condition based on which a deviation between a sensible speed for a driver and an actual traveling speed is predicted; a speed difference determination portion that determines whether a speed difference between the actual traveling speed and a speed limit designated for a traveling road on which the subject vehicle travels is equal to a switching determination value or larger; and a switching control portion that switches a speed display indicating the traveling speed and displayed by the display unit to an emphasized display emphasizing the speed display in a case when the condition determination portion determines that the deviation prediction condition has been established, and also when the speed difference determination portion determines that the speed difference is equal to the switching determination value or larger.

According to another example of the present disclosure, a vehicular display control method for controlling display produced by a display unit of a subject vehicle is provided. The vehicular display control method includes: determining whether a deviation prediction condition has been established for the subject vehicle, the deviation prediction condition being a condition based on which a deviation between a sensible speed for a driver and an actual traveling speed is predicted; determining whether a speed difference between the actual traveling speed and a speed limit designated for a traveling road on which the subject vehicle travels becomes a switching determination value or larger; and switching a speed display indicating the traveling speed and displayed by the display unit to an emphasized display emphasizing the speed display in a case when it is determined that the deviation prediction condition has been established, and also when it is determined that the speed difference is equal to the switching determination value or larger.

According to the vehicular display control apparatus and the vehicular display control method, the speed display indicating the traveling speed and displayed by the display unit of the vehicle is switched to the emphasized display in cases when the deviation between the actual traveling speed and the sensible speed for the driver is predicted, and when the speed difference between the speed limit of the traveling road and the actual traveling speed becomes the switching determination value or larger. Accordingly, a driver viewing the emphasized display is urged to perform safe traveling of the vehicle, and it may be possible to control the traveling speed by an intention of the driver. With this, it may be possible to decrease an uncomfortable feeling of the driver caused by safe traveling assistance.

BRIEF DESCRIPTION OF DRAWINGS

The above and other aspects, features and advantages of the present disclosure will become more apparent from the following detailed description made with reference to the accompanying drawings. In the drawings:

FIG. 5 is a diagram schematically showing deviation prediction conditions in which whether the deviation prediction conditions are established is determined by a first condition determination block in FIG. 3;

FIG. 6 is a diagram schematically showing cancellation prediction conditions in which whether the cancellation prediction conditions are established is determined by a second condition determination block in FIG. 3;

DESCRIPTION OF EMBODIMENTS

Multiple embodiments according to the present disclosure are hereinafter described with reference to the drawings. Identical constituent elements in the respective embodiments have been given identical reference numbers. The redundant explanation may be omitted. For a configuration only partially described in an embodiment, other parts of the configuration of the corresponding embodiment may be understood with reference to configurations of other embodiments previously described. It is allowed to adopt not only combinations of configurations expressly described in the respective embodiments, but also combinations of parts of the multiple embodiments not expressly described as long as no difficulty is particularly caused by the combinations.

First Embodiment

Figure 1:
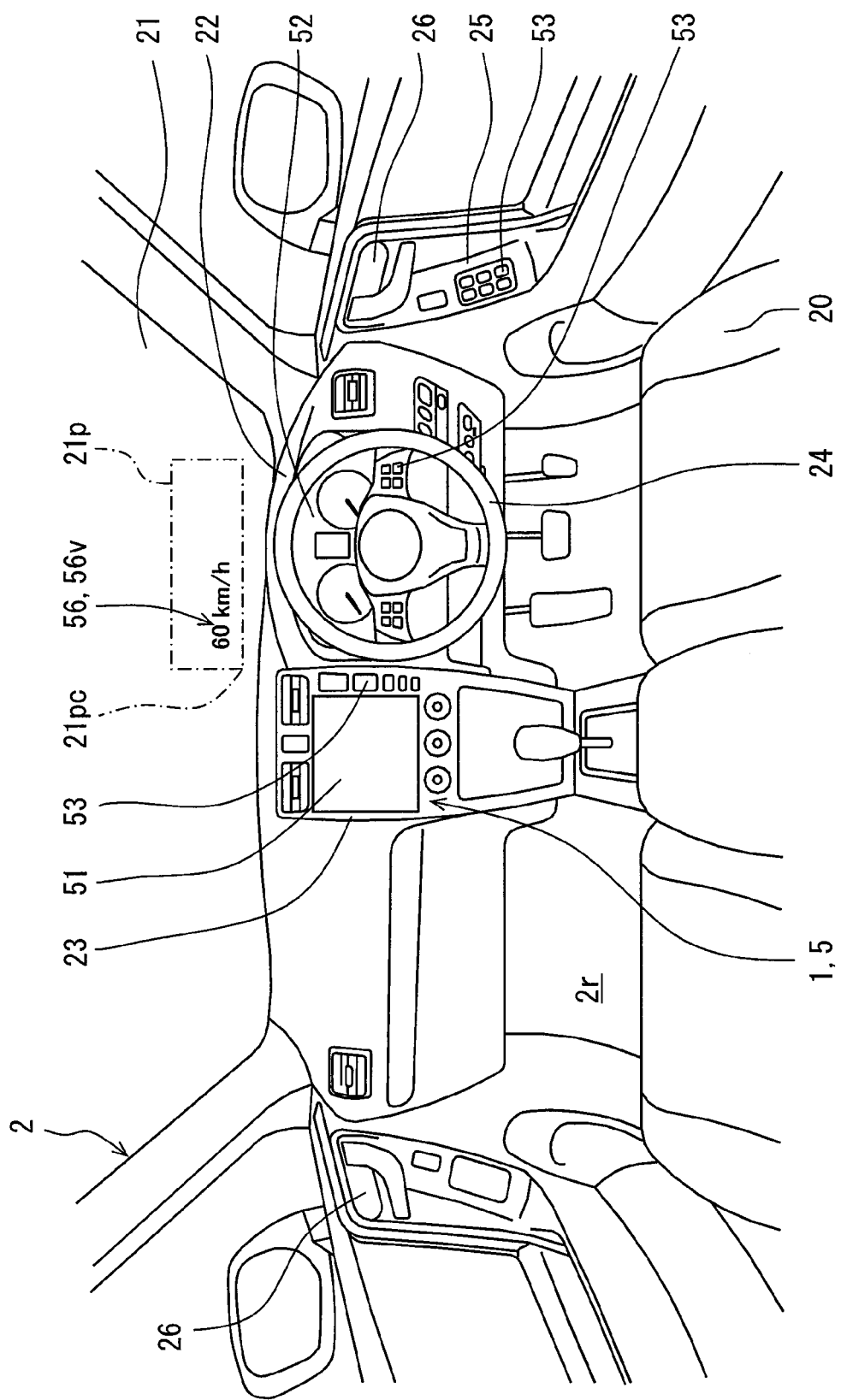
FIG. 1 is a view illustrating a vehicle interior of a subject vehicle on which a traveling assist system according to a first embodiment is mounted.
Figure 2:
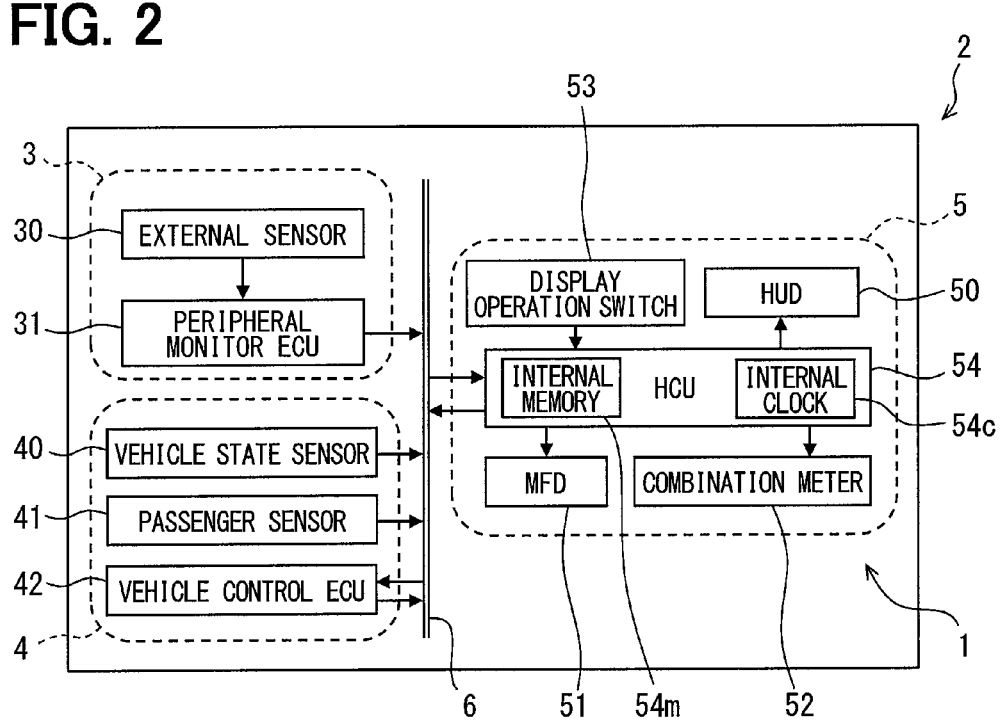
FIG. 2 is a block diagram illustrating the traveling assist system according to the first embodiment.

As illustrated in FIG. 1 and FIG. 2, a traveling assist system 1 according to a first embodiment to which the present disclosure has been applied is mounted on a subject vehicle 2. In the following description, a traveling speed of the subject vehicle 2 is referred to as a traveling speed, and a time and time zone of traveling of the subject vehicle 2 are referred to as a traveling time and a traveling time zone, respectively. In addition, a road on which the subject vehicle 2 travels is referred to as a traveling road, a position of the subject vehicle 2 on the traveling road is referred to as a traveling position, and a speed limit for the subject vehicle 2 on the traveling road is referred to as a speed limit.

The traveling assist system 1 is configured by a peripheral monitoring system 3, a vehicle control system 4, and a display system 5. The systems 3, 4, and 5 of the traveling assist system 1 are connected to each other via an in-vehicle network 6 such as a local area network (LAN).

As illustrated in FIG. 2, the peripheral monitoring system 3 includes an external sensor 30 and a peripheral monitoring electronic control unit (ECU) 31. The external sensor 30 detects an obstacle that is present in an external area of the subject vehicle 2 and may collide with the subject vehicle 2, such as a different vehicle, an artificial structure, a human, an animal or the like. The external sensor 30 further detects traffic signs present in this area. The external sensor 30 is configured by one type or multiple types selected from a millimeter wave radar, a laser radar, a sonar, a camera and the like. Each of the millimeter-wave radar, the laser radar, and the sonar herein receives a reflected wave of a search wave transmitted to a search range in the external area of the subject vehicle 2, and outputs a detection signal indicating an obstacle and a traffic sign. The camera images an obstacle and a traffic sign reaching a range within a set distance in the external area of the subject vehicle 2 by using an image sensor, and outputs an image signal.

The peripheral monitoring ECU 31 is mainly configured by a microcomputer, and connected to the external sensor 30 and the in-vehicle network 6. The peripheral monitoring ECU 31 acquires obstacle information indicating a type of an obstacle, a relative position and a relative speed of an obstacle with respect to the subject vehicle 2, and other information, based on an output signal from the external sensor 30. In addition, the peripheral monitoring ECU 31 acquires sign information indicating a speed limit sign, an entrance/exit guide sign, a tunnel sign, a slope sign, and other information, based on an output signal from the external sensor 30.

The vehicle control system 4 includes a vehicle state sensor 40, an occupant sensor 41, and a vehicle control ECU 42. The vehicle state sensor 40 is connected to the in-vehicle network 6. The vehicle state sensor 40 detects a traveling state of the subject vehicle 2. The vehicle state sensor 40 is configured by one type or multiple types of devices selected from a vehicle speed sensor, an acceleration sensor, an engine speed sensor, a steering angle sensor, an illuminance sensor, a fuel sensor, a battery sensor, a radio wave receiver, and the like. The vehicle speed sensor herein detects the traveling speed of the subject vehicle 2, and outputs a speed signal. The acceleration sensor detects an acceleration acting on the subject vehicle 2, and outputs an acceleration signal. The engine speed sensor detects an engine speed of the subject vehicle 2, and outputs an engine speed signal. The steering angle sensor detects a steering angle or a turning angle of the subject vehicle 2, and outputs an angle signal. The illuminance sensor detects illuminance of the external area of the subject vehicle 2, and outputs an illuminance signal. The fuel sensor detects a fuel residual quantity in a fuel tank of the subject vehicle 2, and outputs a residual quantity signal. The battery sensor detects a battery residual quantity of the subject vehicle 2, and outputs a residual quantity signal. The radio wave receiver receives respective radio waves from a positioning satellite, a different vehicle transmitter for vehicle-to-vehicle communication, a roadside device for road-to-vehicle communication, and the like, and outputs a traffic information signal concerning the subject vehicle 2 and the traveling road, such as the traveling position, the traveling time, the speed limit, and a relative speed with respect to a different vehicle.

The occupant sensor 41 is connected to the in-vehicle network 6. The occupant sensor 41 detects a state of an occupant including a driver of the subject vehicle 2. The occupant sensor 41 is configured by one type or multiple types of devices selected from a driver state monitor, a light switch, a direction indicator switch or the like, for example. The driver state monitor herein images the driver sitting on a driver seat 20 (see FIG. 1) within a vehicle interior 2r of the subject vehicle 2 by using an image sensor, and outputs an image signal. The light switch operated to turn on various types of lights of the subject vehicle 2 outputs an operation signal corresponding to the operation. The direction indicator switch operated to actuate a direction indicator of the subject vehicle 2 outputs an operation signal corresponding to the operation.

The vehicle control ECU 42 is mainly configured by a microcomputer, and connected to the in-vehicle network 6. The vehicle control ECU 42 is configured at least by an integration control ECU, and further by one type or multiple types of devices selected from an engine control ECU, a motor control ECU, a brake control ECU, an integration control ECU, and the like. The engine control ECU herein controls operations of a throttle actuator and a fuel injection valve of an engine to increase or decrease the traveling speed of the subject vehicle 2. The motor control ECU controls an operation of a motor generator to increase or decrease the traveling speed of the subject vehicle 2. The brake control ECU controls an operation of a brake actuator to increase or decrease the traveling speed of the subject vehicle 2. The integration control ECU functioning as a vehicle control ECU 42 issues a control command to the other control ECUs based on output signals from the sensors 40, 41 to control the traveling speed of the subject vehicle 2. In particular, the integration control ECU according to the present embodiment functions as a forced speed reduction unit to forcedly reduce the traveling speed of the subject vehicle 2 to the speed limit or lower when a forced speed reduction condition is established. In this case, the forced speed reduction condition designated for the integration control ECU is a condition that a speed difference between the speed limit on the traveling road and an actual traveling speed becomes a speed reduction determination value needing forced speed reduction or larger, such as 30 km/h or higher.

As illustrated in FIGS. 1 and 2, the display system 5 includes a head-up display (HUD) 50, a multi-function display (MFD) 51, a combination meter 52, display operation switches 53, and a human machine interface control unit (HCU) 54. A human machine interface is also called an HMI. The HCU 54 corresponds to a vehicular display control apparatus.

As illustrated in FIG. 1, an image 56 formed on a liquid crystal panel or a projection screen is projected on a windshield 21 of the subject vehicle 2 by the HUD 50 to display a virtual image of the image 56 in a manner visible to the driver sitting on the driver seat 20. In this case, the virtual image display by the HUD 50 is visually recognized by the driver in a state overlapping with an external scene in front of the subject vehicle 2 in a projection area 21p of the image 56 projected on the windshield 21. The virtual image display by the HUD 50 herein is a speed display 56v (including an emphasized display 56e described below in FIG. 4) that displays the traveling speed of the subject vehicle 2 by using characters in size, color, and form specified beforehand. Accordingly, the HUD 50 in the present embodiment functions as a display unit. The virtual image display by the HUD 50 may be one or multiple types of display selected from navigation information, sign information, obstacle information, and other information as well as the speed display 56v. The virtual display is also realizable by projecting the image 56 on a combiner disposed on an instrument panel 22 in the vehicle interior 2r and transmitting the external scene together with the windshield 21.

An image formed on one or multiple liquid crystal panels is displayed by the MFD 51 on a center console 23 in the vehicle interior 2r. In this case, the display by the MFD 51 is at least display indicating navigation information, and display of one or multiple types selected from audio information, video information, communication information and other information.

The combination meter 52 displays vehicle information on the instrument panel 22 in front of the driver seat 20. The combination meter 52 is configured by an analog meter that displays vehicle information by indication of a scale with a needle, or a digital meter that displays vehicle information by an image formed on the liquid crystal panel. Display of the vehicle information by the combination meter 52 herein is at least display of the traveling speed of the subject vehicle 2, and display of one or multiple types selected from an operation state of the light switch, an operation state of the direction indicator switch, the engine speed, the fuel residual quantity, the battery residual quantity or the like.

The display operation switches 53 are provided at one or multiple positions defined on the driver seat 20 in the vehicle interior 2r and selected from the instrument panel 22, the center console 23, the steering wheel 24, a door panel 25, or the like. The display operation switches 53 are operated to set a display state produced by the respective display elements 50, 51, and 52 of the display system 5. The operation mode of the display operation switches 53 includes one or multiple modes selected from a push operation, a rotation operation, a touch operation, and other operations. Each of the display operation switches 53 outputs an operation signal in accordance with the operation state.

The HCU 54 is mainly configured by a microcomputer, and connected to the other constituent elements 50, 51, 52, and 53 of the display system 5, and the in-vehicle network 6. The HCU 54 synchronously controls the display elements 50, 51, and 52 of the display system 5 based on output signals from the sensors 40 and 41 and the switches 53, acquisition information and control information acquired by the ECUs 31 and 42, and storage information stored in an internal memory 54m. For example, navigation display control for acquiring navigation information and displaying the acquired information on at least the MFD 51 is performed based on an output signal from the radio wave receiver, and map information stored in the internal memory 54m. On the other hand, speed display control for displaying the traveling speed of the subject vehicle 2 by the HUD 50 and the combination meter 52 is performed based on an output signal from the vehicle speed sensor. In particular, in the present embodiment, the HCU 54 functions as a vehicular display control apparatus for controlling the operation of the HUD 50 including the speed display 56v. Details of the HCU 54 are therefore described hereinbelow.

Figure 3:
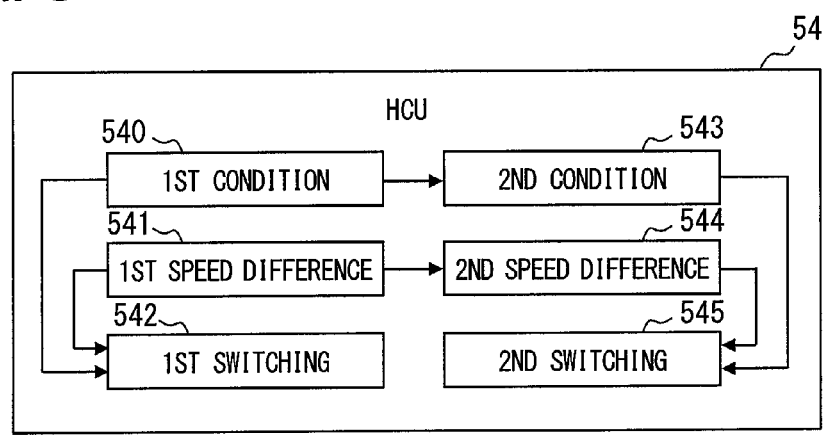
FIG. 3 is a block diagram illustrating multiple blocks configured by an HCU in FIG. 2.

As illustrated in FIG. 3, the HCU 54 performs functions of multiple blocks 540, 541, 542, 543, 544, and 545 by executing a vehicular display control program stored in the internal memory 54m. Needless to say, at least a part of these blocks 540, 541, 542, 543, 544, and 545 may be configured by hardware including one or multiple integrated circuits (ICs).

The first condition determination block 540 configuring a condition determination portion determines whether a deviation prediction condition has been established. The deviation prediction condition is a condition based on which a deviation between a sensible speed for the driver and an actual traveling speed is predicted for the subject vehicle 2. Specific prediction conditions to be adopted are four conditions Cd1, Cd2, Cd3, and Cd4 shown in FIG. 5. The condition Cd1 is a condition that the traveling road is switched from a highway (freeway) to an ordinary road (general road). The highway is a traveling road that allows a higher legal maximum speed, i.e., a higher maximum value of a speed limit legally specified under the jurisdiction, than that of the ordinary road. The condition Cd2 is a condition that the traveling road is switched from an outside to an inside of a tunnel. The tunnel is a traveling road produced by digging a mountain, an underground or the like to penetrate therethrough, and includes a fictitious road regarded as a traveling road meeting the condition Cd2. The condition Cd3 is a condition that the traveling road is a slope. The slope is a traveling road inclined by 5% or larger with respect to a horizontal surface, and includes both an upslope and a downslope. The condition Cd4 is a condition that the traveling time zone is a night time. The night time is a time zone from sunset to sunrise, and includes a fictitious time zone regarded as a time zone meeting the condition Cd4.

The first condition determination block 540 determines whether each of the conditions Cd1, Cd2, Cd3, and Cd4 is established. In this case, determination for the condition Cd1 is made based on one type or multiple types of information selected from the navigation information acquired by the navigation display control, the obstacle information and sign information acquired by the peripheral monitoring ECU 31, the respective output signals from the vehicle speed sensor, the steering angle sensor, the radio wave receiver, the driver state monitor, and the direction indicator switch, or the like. Determination for the condition Cd2 is made based on one type or multiple types of information selected from the navigation information acquired by the navigation display control, the obstacle information and sign information acquired by the peripheral monitoring ECU 31, the respective output signals from the illuminance sensor, the radio receiver, and the light switch, or the like. Determination for the condition Cd3 is made based on one type or multiple types of information selected from the navigation information acquired by the navigation display control, the obstacle information and sign information acquired by the peripheral monitoring ECU 31, the respective output signals from the acceleration sensor, the engine speed sensor, and the radio receiver, or the like. Determination for the condition Cd4 is made based on one type or multiple types of information selected from clock time obtained by an internal clock 54c (see FIG. 2) of the HCU 54, the respective output signals from the illuminance sensor, the radio receiver, and the light switch, or the like.

The first condition determination block 540 determines that the deviation prediction condition has been established when at least one of the conditions Cd1, Cd2, Cd3, and Cd4 is established based on determination in the manner described above. On the other hand, the first condition determination block 540 determines that the deviation prediction condition has not been established when none of the conditions Cd1, Cd2, Cd3, and Cd4 is established.

The first speed difference determination block 541 configuring a speed difference determination portion determines whether a speed difference between the speed limit of the traveling road and the actual traveling speed is a switching determination value or larger. Specifically, the speed limit is acquired based on one type or multiple types of information selected from the navigation information acquired by the navigation display control, the sign information acquired by the peripheral monitoring ECU 31, and the output signal received from the radio receiver. The traveling speed is acquired based on the output signal from the vehicle speed sensor. The switching determination value is set in advance to a speed difference between the speed limit and the traveling speed in a state needing control of the traveling speed by the driver, such as 20 km/h, and stored in the internal memory 54m. In particular in the present embodiment, the switching determination value is set to a value smaller than a speed reduction determination value that is a determination criterion of a forced speed reduction condition and provided as control information for the integration control ECU. Accordingly, when an excess of the traveling speed from the speed limit is the switching determination value or larger in the present embodiment, the first speed difference determination block 541 determines that the speed difference is the switching determination value or larger before establishment of the forced speed reduction condition. In addition, when a shortage of the traveling speed from the speed limit is the switching determination value or larger in the present embodiment, the first speed difference determination block 541 also determines that the speed difference is the switching determination value or larger.

Figure 4:
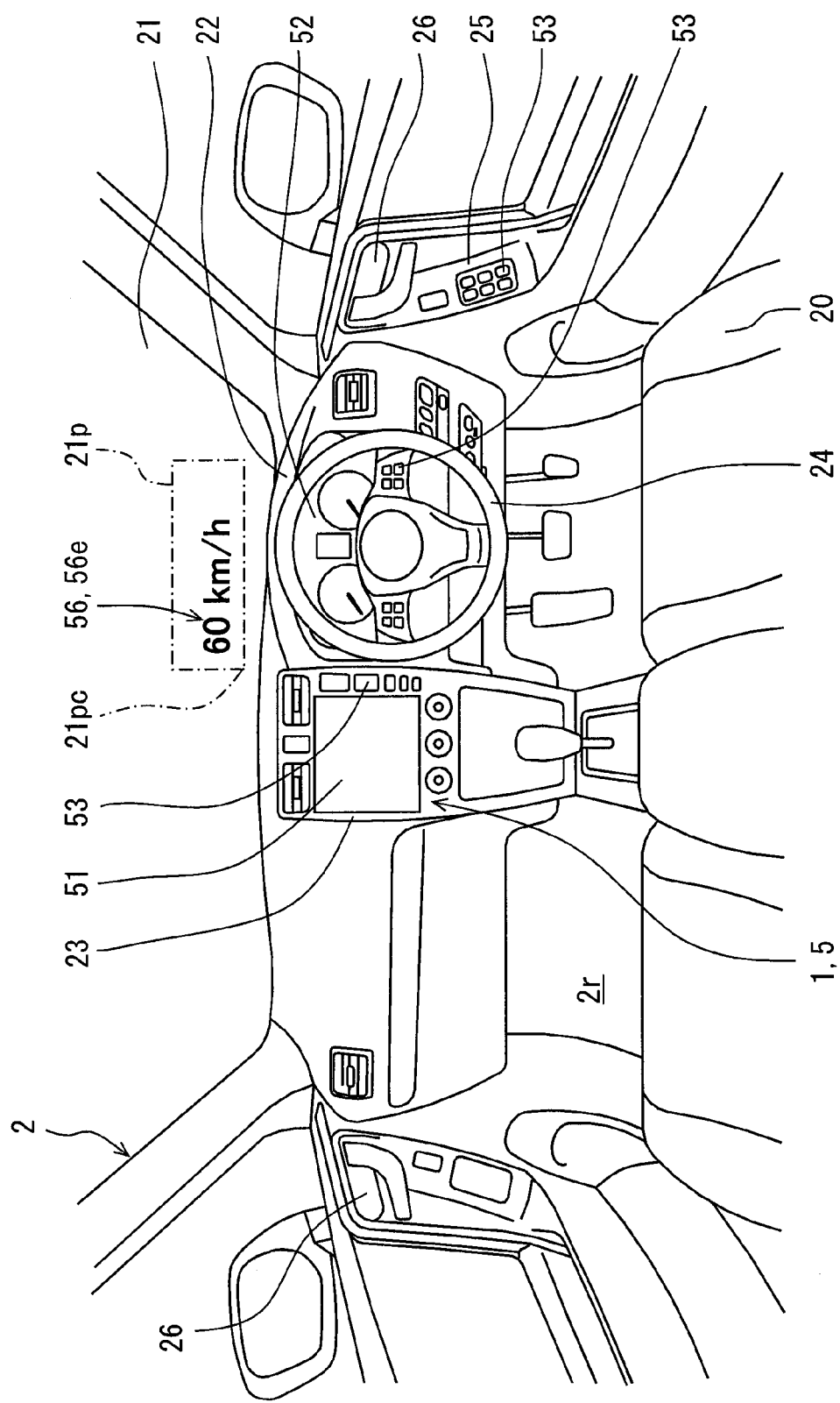
FIG. 4 is a view illustrating a display state of an HUD different from a corresponding display state in FIG. 1.

The first switching control block 542 configuring a switching control portion switches the speed display 56v in FIG. 1 displayed by the HUD 50 to the emphasized display 56e in FIG. 4 when the determination blocks 540 and 541 determine that the deviation prediction condition has been established, and that the speed difference has become the switching determination value or larger. The emphasized display 56e herein is a type of the image 56 that highlights the display state of the traveling speed into more noticeable display than the speed display 56v to improve safe traveling assistance for the driver through attention attraction. In particular in the present embodiment, the emphasized display 56e is formed by expanding the speed display 56v prior to switching toward the upper side and the driver seat 20 side from a start point of a corner 21pc on the lower side and away from the driver seat 20 (see FIG. 1 as well) in the projection area 21p defined in a substantially rectangular shape. Moreover, one type or multiple types of processing selected from a color change of display characters, a form change of display characters, blinking of display characters, a change of font border decoration of display characters, 2D/3D conversion of display characters, negative/positive conversion inside and outside display characters, a shift of the display position, or the like may be additionally performed for formation of the emphasized display 56e as well as the foregoing expanding process. Furthermore, one type or multiple types of processing selected from generation of warning sound or warning voices from an acoustic device 26 provided in the vehicle interior 2r, vibration given to the steering wheel 24, or the like may be additionally performed for formation of the emphasized display 56e.

The second condition determination block 543 configuring a condition determination portion determines whether a cancellation prediction condition has been established after the first condition determination block 540 determines that the deviation prediction condition has been established. The cancellation prediction condition is a condition based on which cancellation of a deviation between the sensible speed and the traveling speed is predicted. Specific cancellation prediction conditions to be adopted are three conditions Cr1, Cr2, and Cr3 shown in FIG. 6. The condition Cr1 is a condition that a cancellation prediction time elapses from the time when the deviation prediction condition has been established. The cancellation prediction time is a predicted time necessary to recognize a deviation between the sensible speed and the traveling speed by viewing the emphasized display 56e, and cancel the deviation by control of the traveling speed by the driver from the time when the deviation prediction condition has been established. The cancellation prediction time is set to 60 seconds, for example. The condition Cr2 is a condition that followability of the traveling state of the subject vehicle 2 to a traveling flow of a different vehicle is achieved after the deviation prediction condition has been established. The followability to a traveling flow is a state that a relative speed of the subject vehicle 2 with respect to different vehicles before and behind the subject vehicle 2 becomes a constant speed or a fictitious speed regarded as a constant speed. The condition Cr3 is a condition that a temporary stop of the subject vehicle 2 is made after the deviation prediction condition has been established. The temporary stop is a state that the traveling speed of the subject vehicle 2 becomes zero, or a fictitious speed regarded as zero.

The second condition determination block 543 determines whether each of the conditions Cr1, Cr2, and Cr3 has been established. In this case, determination of the condition Cr1 is made based on one type or multiple types of information selected from clock time obtained by the internal clock 54c, the output signal from the radio wave receiver, or the like. Determination of the condition Cr2 is made based on one type or multiple types of information selected from the navigation information acquired by the navigation display control, the obstacle information acquired by the peripheral monitoring ECU 31, the respective output signals from the radio wave receiver and the vehicle speed sensor, or the like. In particular in the present embodiment, the second condition determination block 543 determines that the condition Cr2 has been established when the traveling state following the traveling flow continues for a predetermined time, such as 60 seconds, or longer. Determination of the condition Cr3 is made based on one type or multiple types of information selected from the navigation information acquired by the navigation display control, the obstacle information acquired by the peripheral monitoring ECU 31, the respective output signals from the vehicle speed sensor and the engine speed sensor, or the like. In particular in the present embodiment, the second condition determination block 543 determines that the condition Cr3 has been established when a temporary stop is made a predetermined number of times, such as a plural number of times.

The second condition determination block 543 determines that the cancellation prediction condition has been established when at least one of the conditions Cr1, Cr2, and Cr3 determined is established based on determination in the manner described above. On the other hand, when none of the conditions Cr1, Cr2, and Cr3 is established, the second condition determination block 543 determines that the cancellation prediction condition has not been established.

The second speed difference determination block 544 configuring a speed difference determination portion determines whether the speed difference between the speed limit of the traveling road and the actual traveling speed is an end determination value or smaller after the first speed difference determination block 541 determines that the speed difference is the switching determination value or larger. More specifically, the speed limit and the traveling speed are acquired in a manner similar to acquisition of these speeds by the first speed difference determination block 541. The end determination value is set in advance to a speed difference between the speed limit and the traveling speed in a state allowing reduction of discomfort based on an approach of the travelling speed toward the normal speed limit, such as a speed difference of 10 km/h, and is stored in the internal memory 54m. In particular in the present embodiment, the end determination value is set to a value smaller than the switching determination value that is a determination criterion for the speed difference determination by the first speed difference determination block 541. Accordingly, when an excess of the traveling speed from the speed limit decreases to the end determination value or smaller in the present embodiment, the second speed determination block 544 determines that the speed difference is the end determination value or smaller. In addition, in the present embodiment, when a shortage of the traveling speed from the speed limit is the end determination value or smaller, the second speed difference determination block 544 also determines that the speed difference is the end determination value or smaller.

The second switching control block 545 configuring a switching control portion ends the emphasized display 56e in FIG. 4 displayed by the HUD 50, and switches the display to the speed display 56v in FIG. 1 when the determination blocks 543, 544 determine that the cancellation prediction condition has been established and that the speed difference has become the end determination value or smaller. According to the present embodiment, the emphasized display 56e prior to switching is reduced toward the lower side and the side opposite to the driver seat 20 with a center of reduction located at the corner 21pc on the lower side and away from the driver seat 20 in the projection area 21p to return the display to the speed display 56v. Moreover, when the emphasized display 56e includes a color change of display characters, a form change of display characters, blinking of display characters, a change of font border decoration of display characters, 2D/3D conversion of display characters, negative/positive conversion inside and outside of display characters, a shift of the display position, or others, the state subjected to these changes is returned to the state prior to switching. Furthermore, when the emphasized display 56e includes generation of warning sound or warning voices by the acoustic device 26 of the subject vehicle 2, vibration given to the steering wheel 24, or the like, the processing for these changes is stopped.

Figure 7:
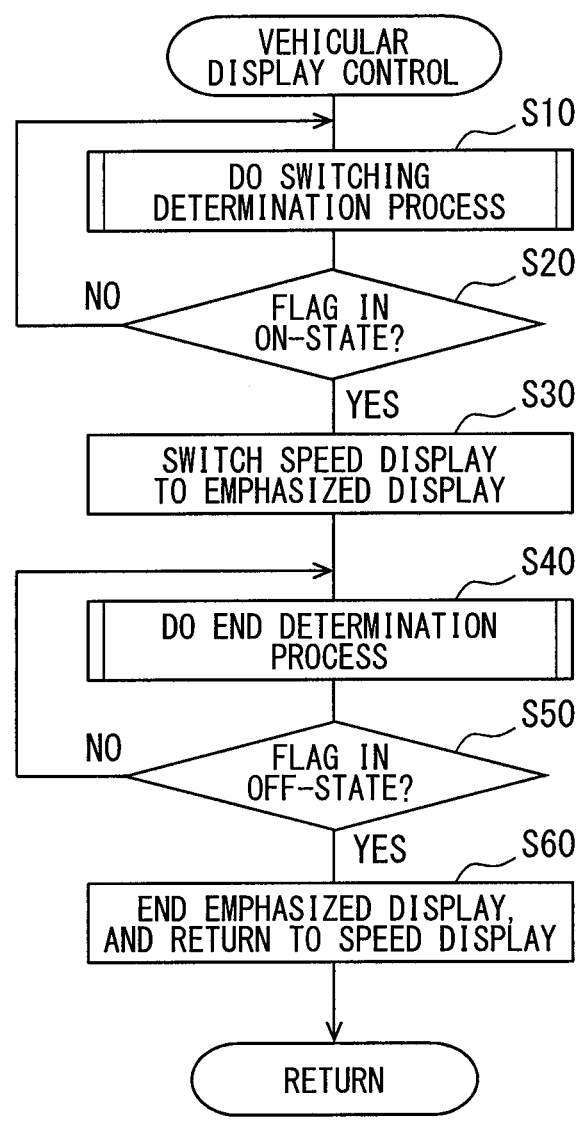
FIG. 7 is a flowchart showing a vehicular display control flow performed by the HCU in FIG. 2.
Figure 8:
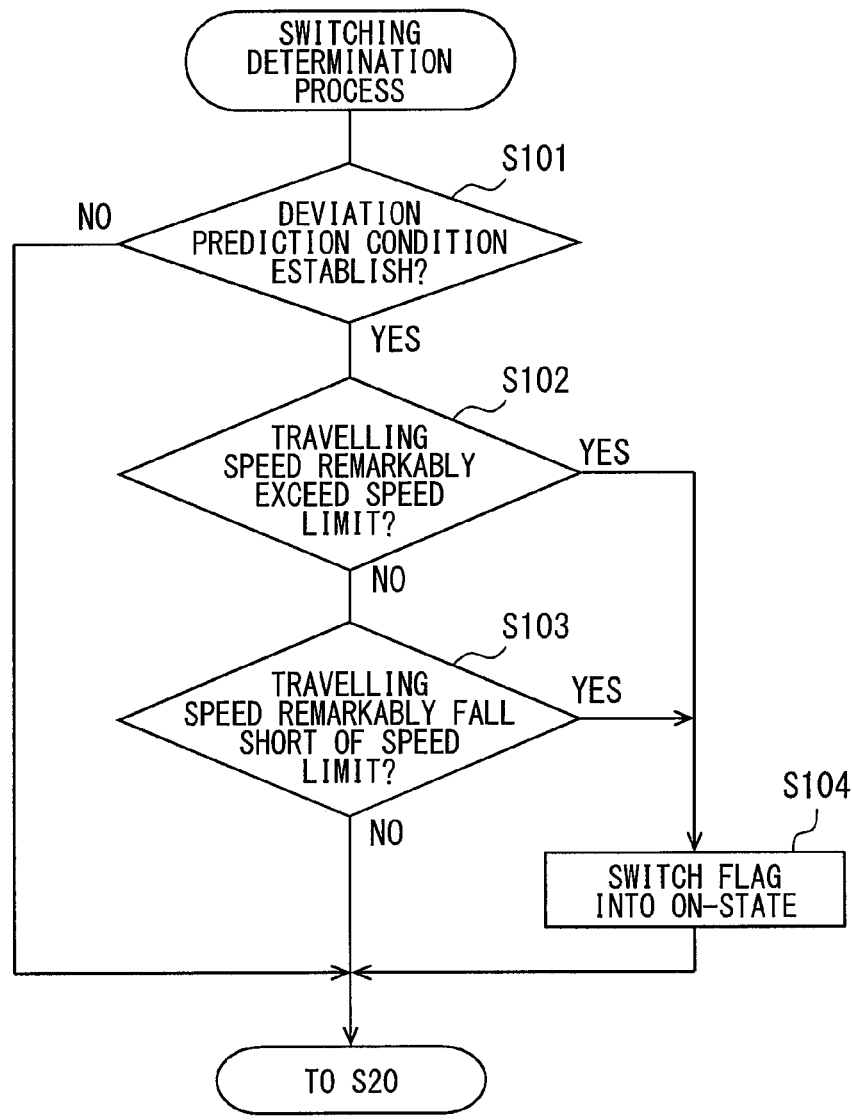
FIG. 8 is a flowchart showing a switching determination process performed at S10 in FIG. 7.
Figure 9:
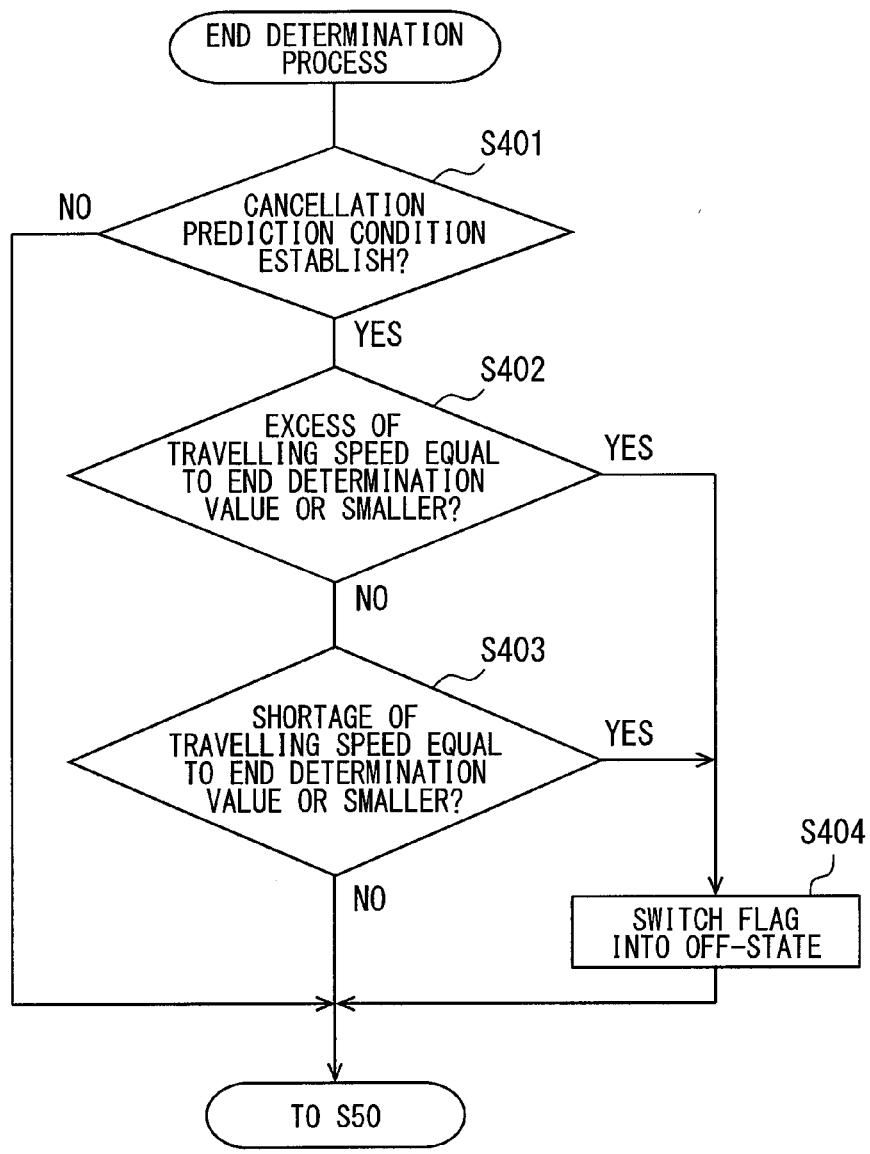
FIG. 9 is a flowchart showing an end determination process performed at S40 in FIG. 7.

A vehicular display control flow shown in FIGS. 7 to 9 corresponding to a vehicular display control method is realized by the HCU 54 configuring the blocks 540, 541, 542, 543, 544, and 545 described above. Details of the control flow are hereinafter described. The vehicular display control flow described herein starts and ends in response to on and off of an engine switch of the subject vehicle 2, respectively. In particular at the start of the vehicular display control flow, a switching determination flag stored in the internal memory 54m is brought into an off-state, and the normal speed display 56v is displayed by the HUD 50. Note that "S" shown in the vehicular display control flow indicates a step (or referred to as a section). Each of the steps may be divided into multiple sub steps. In addition, the multiple steps may be combined into one step.

Initially, a switching determination process is executed in S10 of the vehicular display control flow in FIG. 7. More specifically, the first condition determination block 540 determines whether the deviation prediction condition has been established in S101 of the switch determination process as shown in FIG. 8. A specific process performed herein is to determine whether any one of the four conditions Cd1, Cd2, Cd3, and Cd4 (see FIG. 5) as the deviation prediction conditions has been established. When a negative determination is made based on a state that no deviation is predicted between the sensible speed and the traveling speed, the switching determination process ends. On the other hand, when a positive determination is made based on a state that deviation is predicted between the sensible speed and the traveling speed, the flow shifts to S102.

In S102, the first speed difference determination block 541 determines whether the traveling speed remarkably exceeds the speed limit by a speed difference equivalent to the switching determination value or larger. When a negative determination is made, the flow shifts to S103. In S103, the first speed difference determination block 541 determines whether the traveling speed remarkably falls short of the speed limit by a speed difference being the switching determination value or larger. When a negative determination is made in S103, the switching determination process ends.

When a positive determination is made in either S102 or S103, rather than a negative determination in either S102 or S103, based on a state that the speed difference between the speed limit and the traveling speed is the switching determination value or larger, the flow shifts to S104. In S104, the first switching control block 542 brings the switching determination flag into an on-state. Thereafter, the switching determination process ends.

When the switching determination process ends by the above processing, the flow shifts to S20 in FIG. 7. In S20, the first switching control block 542 determines whether the switching determination flag is in the on-state. When a negative determination is made in S20, the flow returns to S10. On the other hand, when a positive determination is made, the flow shifts to S30 to switch the speed display 56v by the HUD 50 to the emphasized display 56e under control by the first switching control block 542.

After switching to the emphasized display 56e, the flow shifts to S40. In S40, an end determination process is executed. More specifically, in S401 of the end determination process, the second condition determination block 543 determines whether the cancellation prediction condition has been established as shown in FIG. 9. A specific process performed in this step is to determine whether any one of the three conditions Cr1, Cr2, and Cr3 (see FIG. 6) corresponding to the cancellation prediction condition has been established. When a negative determination is made in this step based on a state that the deviation between the sensible speed and the traveling speed has not been cancelled, the end determination process ends. On the other hand, when a positive determination is made based on a state that the deviation between the sensible speed and the traveling speed has been cancelled, the flow shifts to S402.

In S402, the second speed difference determination block 544 determines whether an excess of the traveling speed from the speed limit has become the end determination value or smaller. When a negative determination is made in this step, the flow shifts to S403. In S403, the second speed difference determination block 544 determines whether a shortage of the traveling speed from the speed limit has become the end determination value or smaller. When a negative determination is made in this step, the end determination process ends.

When a positive determination is made in either S402 or S403, rather than a negative determination in S402 or S403, based on a state that the speed difference between the speed limit and the traveling speed has become the end determination value or smaller, the flow shifts to S404. In S404, the second switching control block 545 brings the switching determination flag into an off-state. Thereafter, the end determination process ends.

When the switching determination process ends by the foregoing processing, the flow shifts to S50 in FIG. 7. In S50, the second switching control block 545 determines whether the switching determination flag is in the off-state. When a negative determination is made in this step, the flow returns to S40. On the other hand, when a positive determination is made, the flow shifts to S60. In this step, the second switching control block 545 ends the emphasized display 56e displayed by the HUD 50 to return the display to the speed display 56v, and then the flow returns to S10.

In the vehicular display control flow described above, S101 of the switching determination process in S10 corresponds to a condition determination step, and S102 and S103 of the switching determination process in S10 correspond to a speed difference determination step. In addition, in the vehicular display control flow, S104 of the switching determination process in S10, and S20 and S30 correspond to a switching control step.

Examples of advantageous effects offered in the first embodiment presented herein are now described.

According to the first embodiment, the speed display 56v displayed by the HUD 50 of the subject vehicle 2 to indicate the traveling speed is switched to the emphasized display 56e in a particular state. The particular state herein is a state that a deviation is predicted between the actual traveling speed and the sensible speed of the driver, and that the speed difference between the speed limit of the traveling road and the actual traveling speed becomes the switching determination value or larger. In this case, the driver viewing the emphasized display 56e in the foregoing state is urged to perform safe driving of the subject vehicle 2, and it may be possible to control the traveling speed by driver intension. With this, it may be possible to decrease an uncomfortable feeling of the driver caused by safe traveling assistance.

According to the first embodiment, the speed difference between the speed limit and the traveling speed is determined before the traveling speed is forcedly reduced to the speed limit or lower by the integration control ECU configured by the vehicle control ECU 42 of the subject vehicle 2. In this case, the driver viewing the emphasized display 56e is urged to perform safe traveling when the speed difference becomes the switching determination value or larger prior to forced speed reduction in a state of prediction of a deviation between the sensible speed and the traveling speed. Accordingly, it may be possible to decrease an uncomfortable feeling caused by forced speed reduction.

According to the first embodiment, the driver viewing the emphasized display 56e formed by expanding the speed display 56v intuitively can recognize a state in need of control of the traveling speed. In particular in the first embodiment, the emphasized display 56e formed by expanding the speed display 56v toward the driver seat 20 is easily viewed by the driver sitting on the driver seat 20. In this case, the state in need of control of the traveling speed is easily recognizable. Accordingly, safe traveling assistance securely improves.

According to the first embodiment, it is predicted that the sensible speed for the driver deviates from the traveling speed when the traveling road of the subject vehicle 2 switches to an ordinary road from a highway which allows a higher legal maximum speed than that of the ordinary road and therefore may lower speed sensitivity of the driver. Accordingly, when the speed difference between the speed limit and the traveling speed becomes the switching determination value or larger in a state of switching of the traveling road from the highway to the ordinary road, the speed display 56v is switched to the emphasized display 56e to allow the driver to recognize the foregoing situation even in a state of lowered speed sensitivity. In this case, the driver viewing the emphasized display 56e is urged to perform safe traveling on the ordinary road, and therefore it may be possible to realize safe traveling assistance while reducing an uncomfortable feeling of the driver.

According to the first embodiment, it is predicted that the sensible speed for the driver deviates from the traveling speed when the traveling road of the subject vehicle 2 switches to an inside of a tunnel that is narrower and darker than an outside of the tunnel and therefore may lower speed sensitivity of the driver. Accordingly, when the speed difference between the speed limit and the traveling speed becomes the switching determination value or larger in a state of switching of the traveling road from the outside to the inside of the tunnel, the speed display 56v is switched to the emphasized display 56e to allow the driver to recognize the foregoing situation even in a state of lowered speed sensitivity. In this case, the driver viewing the emphasized display 56e is urged to perform safe traveling inside the tunnel, and therefore it may be possible to realize safe traveling assistance while reducing an uncomfortable feeling of the driver.

According to the first embodiment, it is predicted that the sensible speed for the driver deviates from the traveling speed when the traveling road of the subject vehicle 2 is a slope easily producing a rapid change of the traveling speed and therefore may lower speed sensitivity of the driver. Accordingly, when the speed difference between the speed limit and the traveling speed becomes the switching determination value or larger on the slope, the speed display 56v is switched to the emphasized display 56e to allow the driver to recognize the foregoing situation even in a state of lower speed sensitivity. In this case, the driver viewing the emphasized display 56e is urged to perform safe traveling on the slope, and thus it may be possible to realize safe traveling assistance while reducing an uncomfortable feeling of the driver.

According to the first embodiment, it is predicted that the sensible speed for the driver deviates from the traveling speed when the traveling time zone is a night time with darkness around the subject vehicle 2 and therefore may lower speed sensitivity of the driver. Accordingly, when the speed difference between the speed limit and the traveling speed becomes the switching determination value or higher at night, the speed display 56v is switched to the emphasized display 56e to allow the driver to recognize the foregoing situation even in a state of lowered speed sensitivity. In this case, the driver viewing the emphasized display 56e is urged to perform safe traveling at night, and thus it may be possible to realize safe traveling assistance while reducing an uncomfortable feeling of the driver.

According to the first embodiment, the emphasized display 56e ends in a state that cancellation of a deviation between the sensible speed and the traveling speed is predicted, and that the speed difference between the speed limit and the traveling speed becomes the end determination value or smaller. Accordingly, it may be possible for the driver to intuitively recognize that safe traveling has been secured due to cancellation of the deviation. In this case, excessive continuation of safe traveling assistance by the emphasized display 56e is avoidable, and thus it may be possible to decrease discomfort for the driver caused by safe traveling assistance.

According to the first embodiment, the emphasized display 56e ends after an elapse of the cancellation prediction time necessary for cancellation of a deviation between the sensible speed and the traveling speed from the time of prediction of the deviation. Accordingly, excessive continuation of safe traveling assistance by the emphasized display 56e is securely avoidable, and thus it may be possible to provide a discomfort reduction effect with reliability.

According to the first embodiment, the emphasized display 56e ends based on prediction of cancellation of a deviation between the sensible speed and the traveling speed when the traveling speed of the subject vehicle 2 starts to follow a traveling flow of a different vehicle after prediction of the deviation. Accordingly, excessive continuation of safe traveling assistance by the emphasized display 56e is securely avoidable, and thus a discomfort reduction effect becomes more reliable.

According to the first embodiment, the emphasized display 56e ends based on prediction of cancellation of a deviation between the sensible speed and the traveling speed when the vehicle temporarily stops after prediction of the deviation. Accordingly, excessive continuation of safe traveling assistance by the emphasized display 56e is securely avoidable, and thus it may be possible to provide a discomfort reduction effect with reliability.

Second Embodiment

Figure 10:
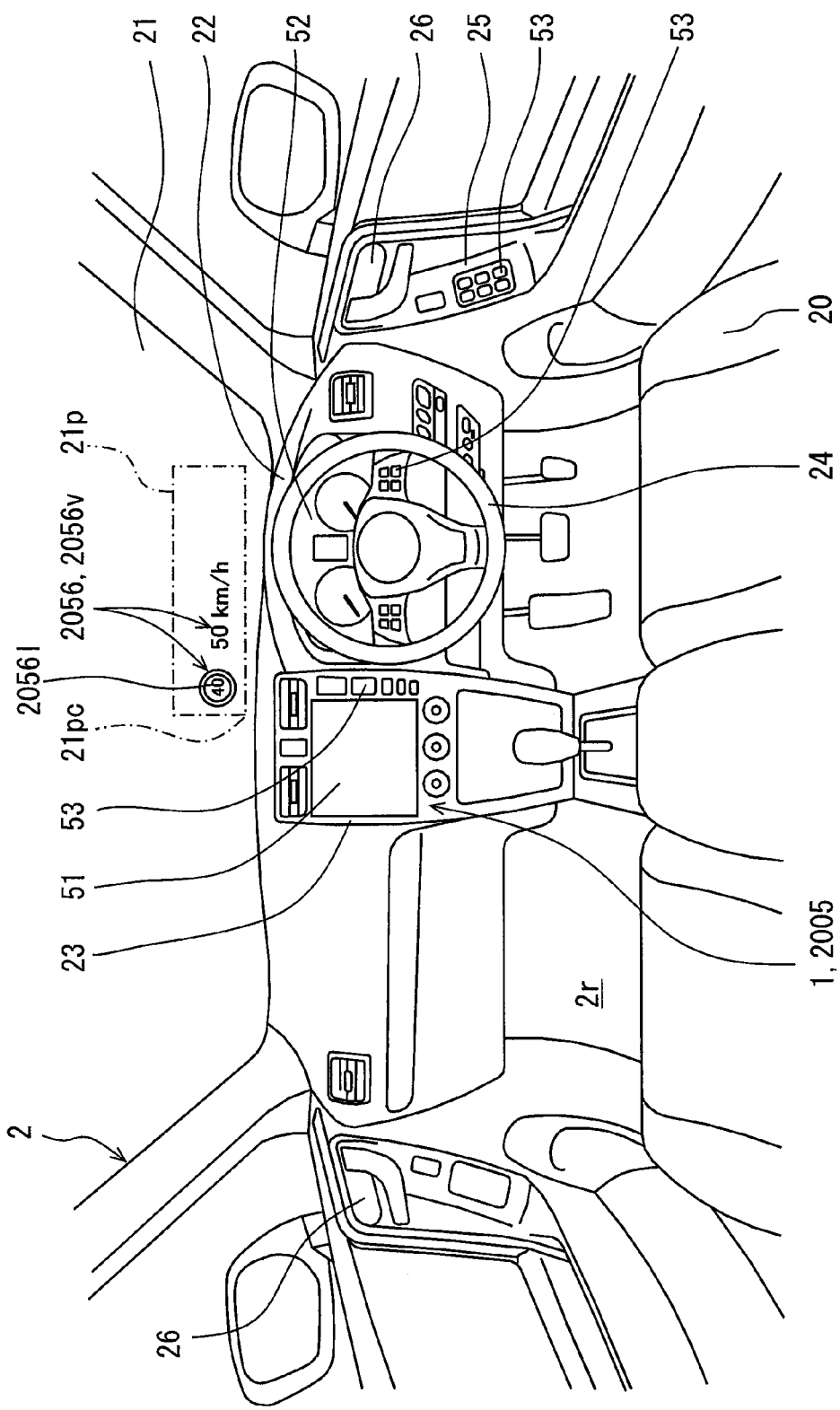
FIG. 10 is a view illustrating a vehicle interior of a subject vehicle on which a traveling assist system according to a second embodiment is mounted.
Figure 11:
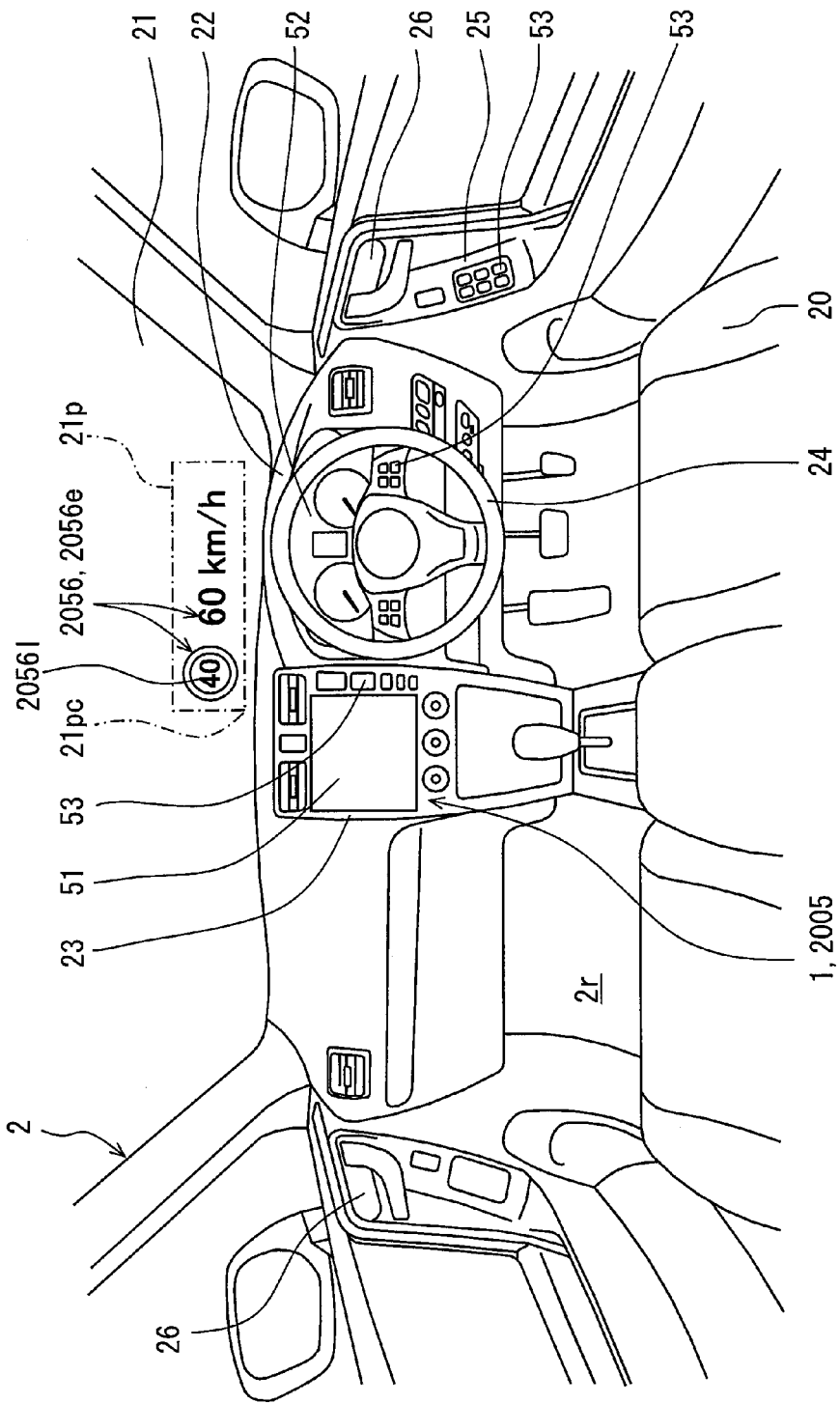
FIG. 11 is a view illustrating a display state of an HUD different from a corresponding display state in FIG. 10.

A second embodiment of the present disclosure illustrated in FIGS. 10 and 11 is a modification of the first embodiment. As illustrated in FIG. 10, a speed display 2056v indicating a speed limit as well as a traveling speed is provided by an HUD 2050 functioning as a display unit in a display system 2005 of the second embodiment. The speed limit herein is displayed on an image 2056I indicating a speed limit sign, for example, at a position adjacent to the traveling speed displayed similarly to the first embodiment.

According to the second embodiment, the speed display 2056v displayed by the HUD 2050 as illustrated in FIG. 10 is switched to an emphasized display 2056e in FIG. 11 under control by the first switching control block 542 of the HCU 54. The emphasized display 2056e herein corresponds to an image 2056 whose display states of both the traveling speed and the speed limit are expanded into more emphasized and more noticeable display states than the display state of the speed display 2056v to improve safe traveling assistance for the driver through attention attraction. Note that the process for forming the emphasized display 2056e and the process in S30 of the vehicular display control flow are processes similar to the corresponding processes performed in the first embodiment.

Furthermore, the emphasized display 2056e displayed by the HUD 2050 in FIG. 11 is ended by the second switching control block 545 of the HCU 54 to return to the speed display 2056v in FIG. 10 according to the second embodiment. Note that the process for returning to the speed display 2056v, and the process in S60 in the vehicular display control flow are processes similar to the corresponding processes performed in the first embodiment.

According to the HUD 2050 in the second embodiment, therefore, the speed display 2056v displaying the speed limit as well as the traveling speed is expanded to form the emphasized display 2056e. Accordingly, it may be possible for the driver to intuitively recognize a state in need of control of the traveling speed based on not only expansion of the traveling speed and the speed limit simultaneously visible as the emphasized display 2056e, but also a speed difference between these speeds. Accordingly, it may be possible to improve safe traveling assistance dramatically. Furthermore, the advantageous effects described in the first embodiment are similarly offered by the second embodiment.

Third Embodiment

Figure 12:
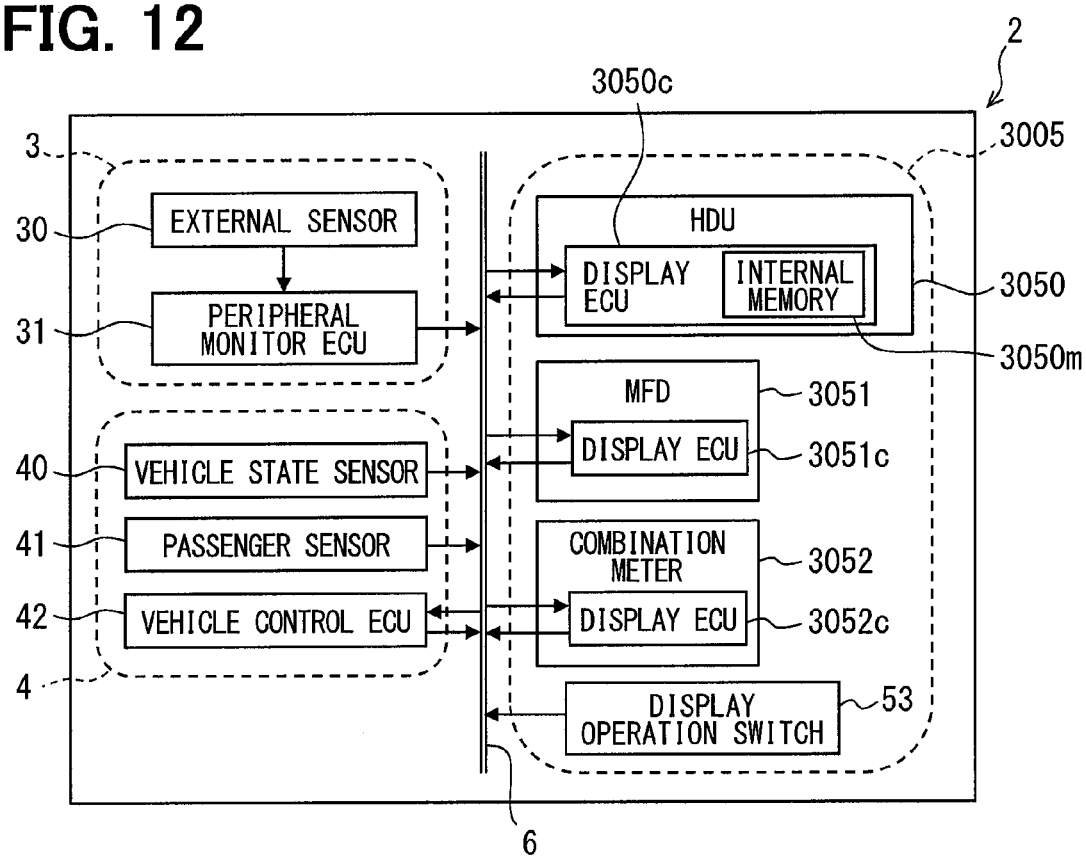
FIG. 12 is a block diagram illustrating a traveling assist system according to a third embodiment.
Figure 13:
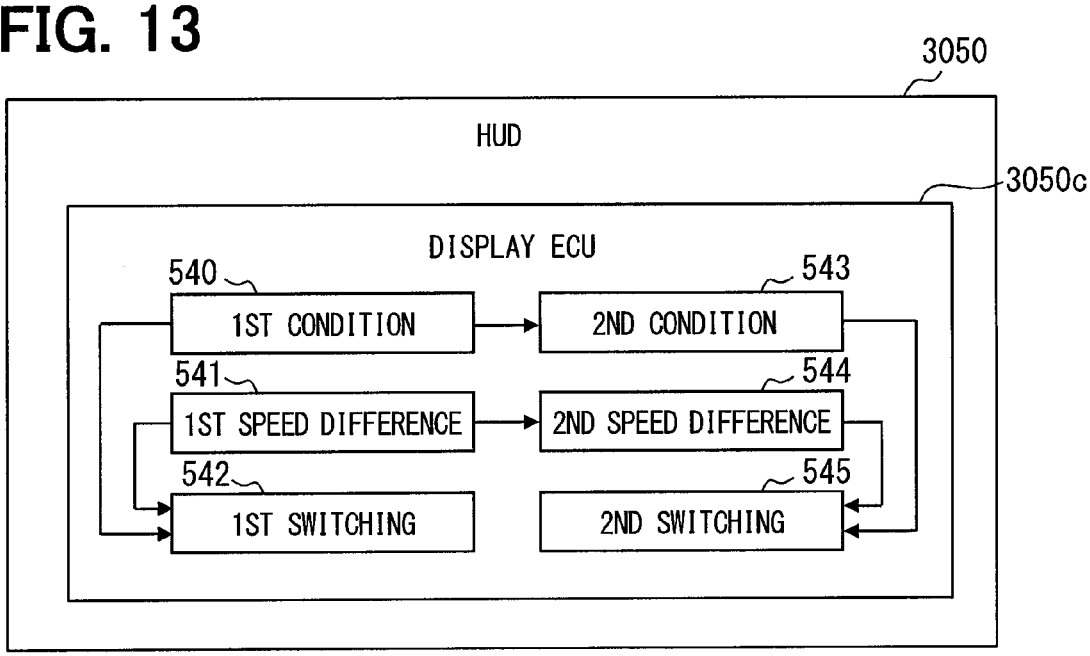
FIG. 13 is a block diagram illustrating multiple blocks configured by a display ECU of an HUD in FIG. 12.

A third embodiment of the present disclosure illustrated in FIGS. 12 and 13 is a modification of the first embodiment. As illustrated in FIG. 12, a display system 3005 according to the third embodiment is not equipped with the HCU 54. Accordingly, display ECUs 3050c, 3051c, and 3052c, each of which is mainly configured by a microcomputer, are included in display elements 3050, 3051, and 3052 of the display system 3005, respectively, and connected to the in-vehicle network 6 to which the display operation switches 53 are also connected. In the display system 3005 thus structured, the control function of the HCU 54 described in the first embodiment is split into partial functions performed by the display ECUs 3050c, 3051c, and 3052c of the respective display elements 3050, 3051, and 3052. For example, the navigation display control is executed at least by the display ECU 3051*c* of the MFD 3051. The speed display control is executed by each of the display ECU 3050*c* of the HUD 3050 and the display ECU 3052*c* of the combination meter 3052. The display ECU 3050*c* corresponds to the vehicular display control apparatus. The display ECU 3051*c* also corresponds to the vehicular display control apparatus.

According to the third embodiment, the HUD 3050 functions as a display unit. In addition, the display ECU 3050*c* of the HUD 50 functions as the vehicular display control apparatus for controlling operation of the HUD 3050 similarly to the HCU 54 according to the first embodiment. More specifically, the display ECU 3050*c* executes a vehicular display control program stored in an internal memory 3050*m* to configure functions of the multiple blocks 540, 541, 542, 543, 544, and 545 as illustrated in FIG. 13. In addition, the vehicular display control flow is executed by the display ECU 3050*c* configuring the blocks 540, 541, 542, 543, 544, and 545 similarly to the first embodiment. Accordingly, the advantageous effects described in the first embodiment are similarly offered by the foregoing third embodiment.

Other Embodiments

While the multiple embodiments according to the present disclosure have been described, it is not intended that interpretation of the present disclosure be limited to the respective embodiments herein. The present disclosure may be practiced otherwise, or in combination of the respective embodiments without departing from the scope of the present disclosure.

More specifically, in a modified example 1, forced speed reduction by the vehicle control ECU 42 configuring the integration control ECU may be omitted. In a modified example 2, the emphasized displays 56*e* and 2056*e* may be formed by expanding the speed display 56*v* from a start point located at positions other than the specific corner 21*pc* in the projection area 21*p*, such as a central portion or other corners of the projection area 21*p*. In a modified example 3, the emphasized displays 56*e* and 2056*e* may be formed not by the expansion process presented in the first embodiment as an example, but by performing one type or multiple types of processes other than the expansion process. In a modified example 4, the emphasized displays 56*e* and 2056*e* may be formed by emphasizing display of a fine amount imposed as a penalty for an excessive speed together with display of the traveling speed.

Figure 14:
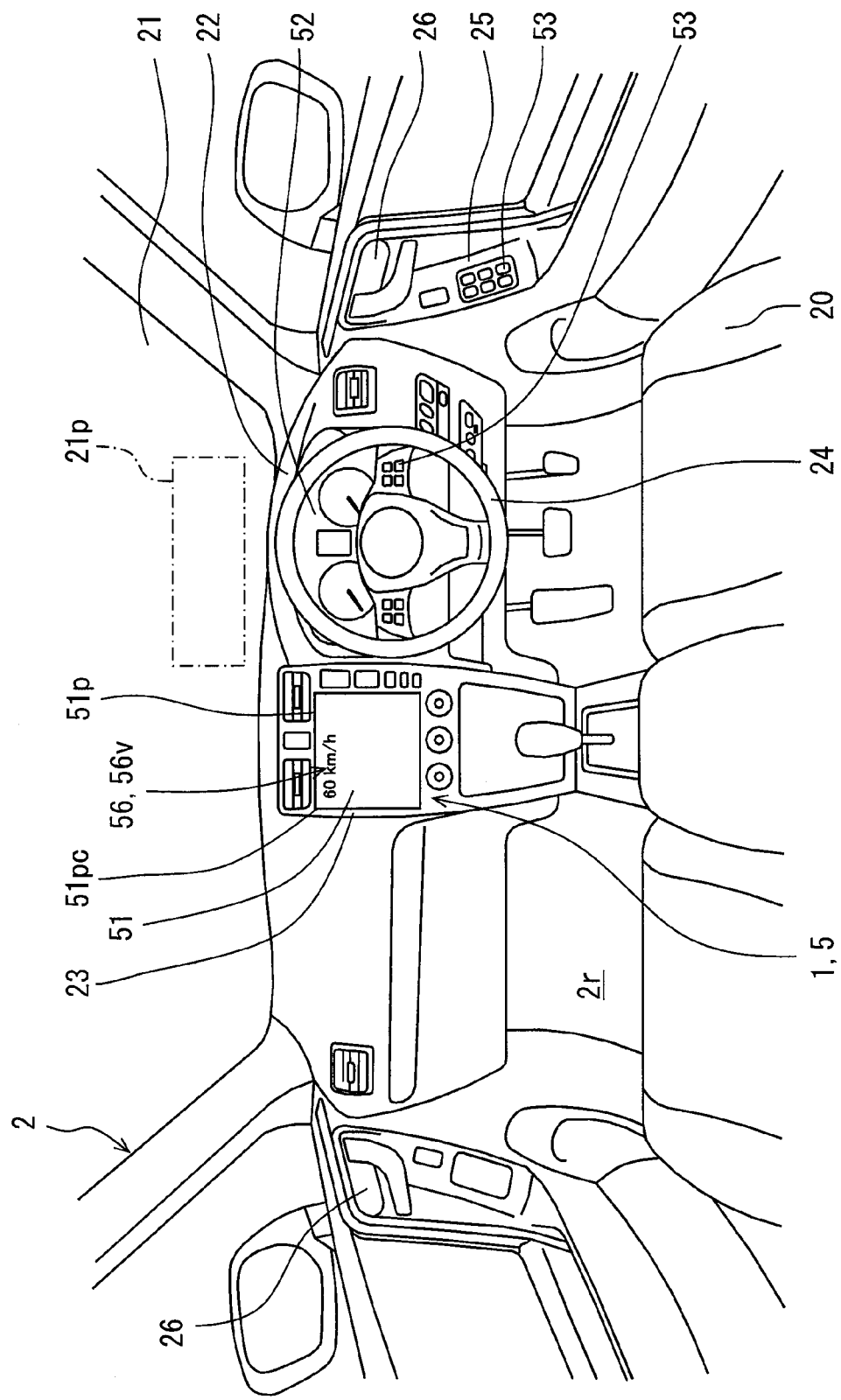
FIG. 14 is a view illustrating a modified example of FIG. 1.
Figure 15:
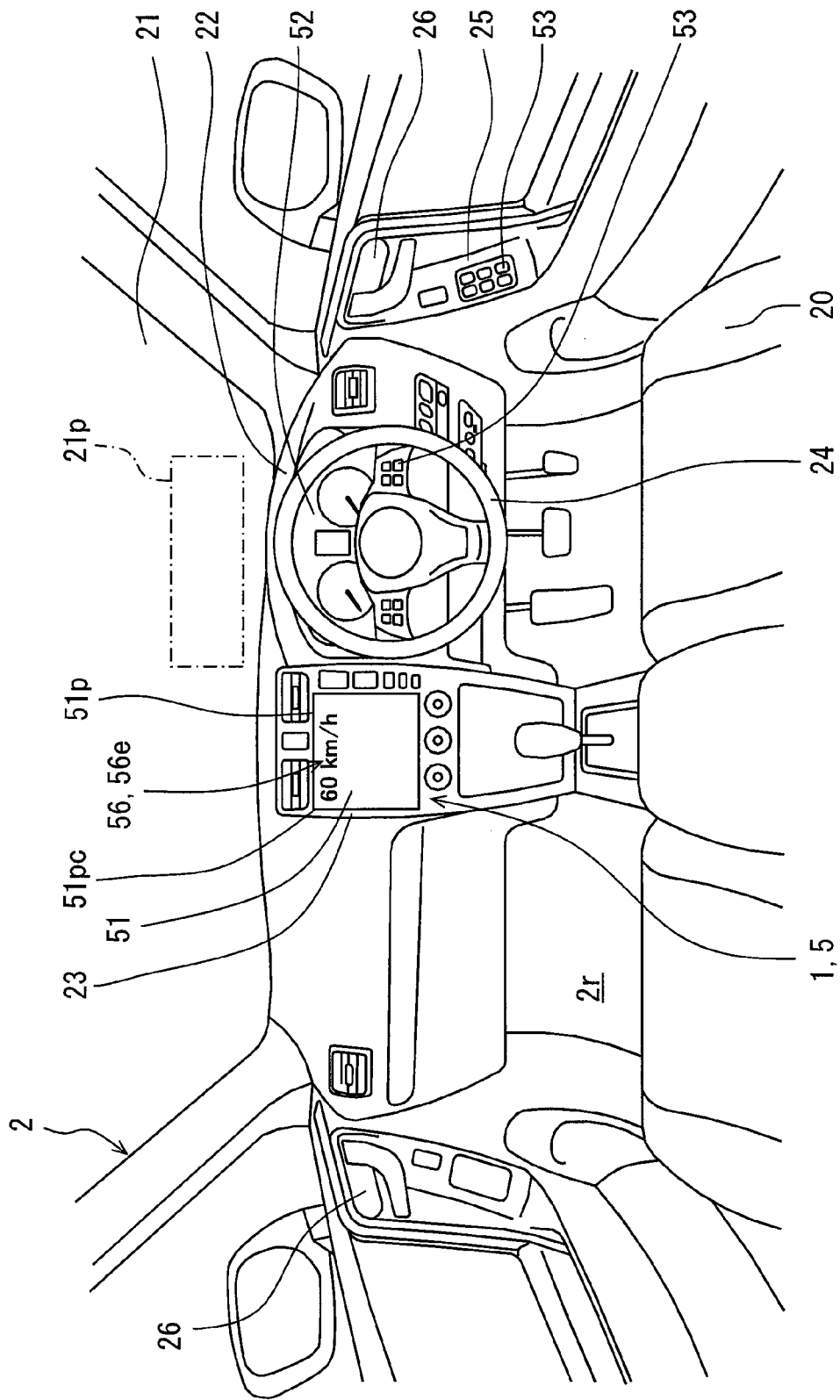
FIG. 15 is a view illustrating a modified example of FIG. 4.
Figure 16:
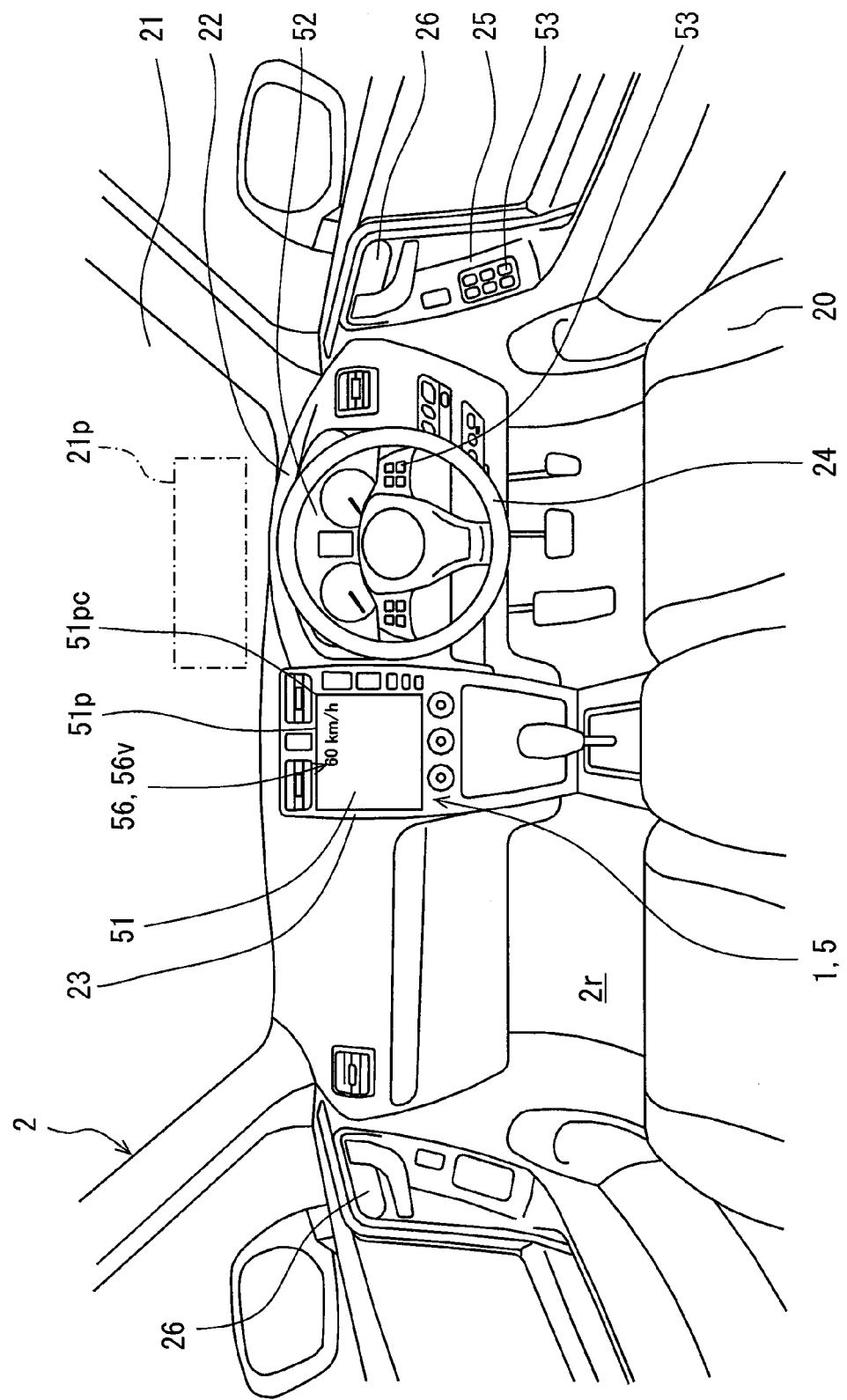
FIG. 16 is a view illustrating a modified example of FIG. 1.
Figure 17:
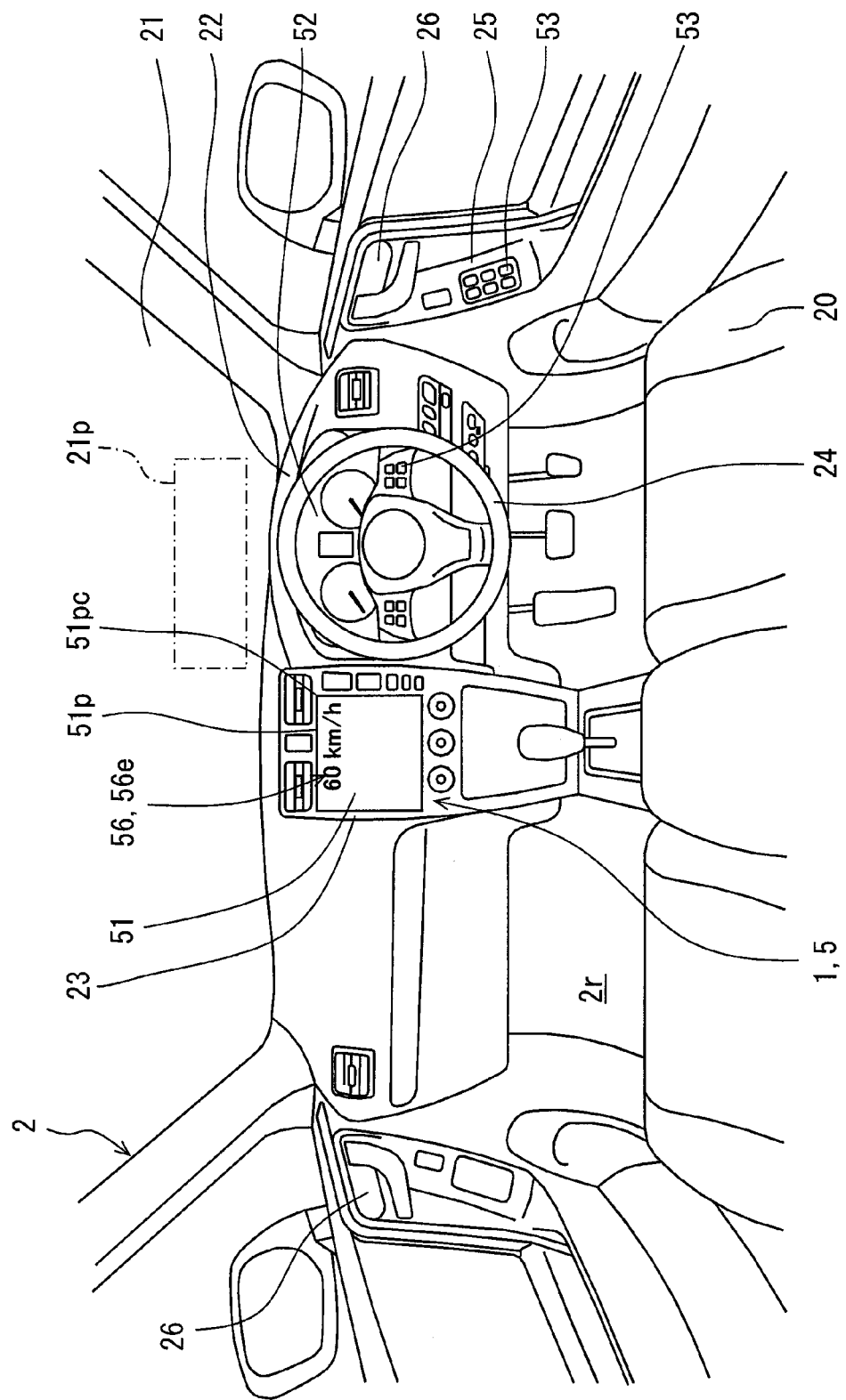
FIG. 17 is a view illustrating a modified example of FIG. 4.

In a modified example 5, each of the display elements other than the HUD 50, such as the MFD 51 and 3051, may function as a display unit. According to an example illustrated in FIGS. 14 and 15 as the modified example 5 of the first embodiment, the emphasized display 56*e* is formed by expanding the speed display 56*v* prior to switching toward the lower side and the driver seat 20 side from a start point located at a corner 51*pc* on the upper side and away from the driver seat 20 in a display area 51*p* defined in a substantially rectangular shape in the MFD 51. On the other hand, according to an example illustrated in FIGS. 16 and 17 as the modified example 5 of the first embodiment, the emphasized display 56*e* is formed by expanding the speed display 56*v* prior to switching toward the lower side and the side opposite to the driver seat 20 side from a start point located at the corner 51*pc* on the upper side and close to the driver seat 20 in the display area 51*p*.

According to the modified example 5 of the first and second embodiments, the HCU 54 functions as the vehicular display control apparatus for controlling operation of the MFD 51 including the speed displays 56*v* and 2056*v*. According to the modified example 5 of the third embodiment, the display ECU 3051*c* of the MFD 3051 functions as the vehicular display control apparatus for controlling operation of the MFD 3051 including the speed display 56*v*.

In a modified example 6, the deviation prediction conditions may be three or fewer conditions selected from the conditions Cd1, Cd2, Cd3, and Cd4. In a modified example 7, the deviation prediction conditions may be selected from conditions other than the conditions Cd1, Cd2, Cd3, and Cd4 as long as a deviation between the sensible speed and the traveling speed is predictable under the selected conditions.

In a modified example 8, the cancellation prediction conditions may be two or fewer condition selected from the conditions Cr1, Cr2, and Cr3. In a modified example 9, it may be determined that the condition Cr2 corresponding to the cancellation prediction condition has been established based on a state that a traveling state following a traveling flow is confirmed at least temporarily. In a modified example 10, it may be determined that the condition Cr3 corresponding to the cancellation prediction condition has been established based on a state that a temporary stop is confirmed at least once. In a modified example 11, cancelation prediction conditions other than the conditions Cr1, Cr2, and Cr3 may be adopted as long as cancellation of a deviation between the sensible speed and the traveling speed is predictable based on the adopted conditions.

In a modified example 12, the end determination process in S401 may be omitted from the vehicular display control flow with elimination of the second condition determination block 543. In the modified example 12, the emphasized displays 56*e* and 2056*e* end when the speed difference between the speed limit and the traveling speed becomes the end determination value or smaller. In this case, it may be possible for the driver to intuitively recognize that safe traveling has been secured. Accordingly, it may be possible to avoid excessive continuation of safe traveling assistance achieved by the emphasized displays 56*e* and 2056*e*, and thus it may be possible to decrease discomfort for the driver caused by safe traveling assistance.

In a modified example 13, the end determination process in S402 and S403 may be omitted from the vehicular display control flow with elimination of the second speed difference determination block 544. In the modified example 13, the emphasized displays 56*e* and 2056*e* end when cancellation of a deviation between the sensible speed and the traveling speed is predicted. In this case, the driver intuitively recognizes that safe traveling has been secured. Accordingly, excessive continuation of safe traveling assistance achieved by the emphasized displays 56*e* and 2056*e* is avoidable, and thus discomfort for the driver caused by safe traveling assistance decreases.

While various embodiments, configurations, and aspects of a vehicular display control apparatus and a vehicular display control method have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A vehicular display control apparatus controlling a display made by a display unit of a subject vehicle, the vehicular display control apparatus comprising:
   a condition determination portion that determines whether a deviation prediction condition has been established for the subject vehicle, the deviation prediction condition being a condition based on which a deviation between a sensible speed for a driver and an actual traveling speed is predicted;
   a speed difference determination portion that determines whether a speed difference between the actual traveling speed and a speed limit designated for a traveling road on which the subject vehicle travels is equal to a switching determination value or larger, and whether a shortage of the traveling speed from the speed limit is equal to the switching determination value or larger; and
   a switching control portion that switches a speed display indicating the traveling speed and displayed by the display unit to an emphasized display emphasizing the speed display in a case when the condition determination portion determines that the deviation prediction condition has been established, and also when the speed difference determination portion determines that the speed difference is equal to the switching determination value or larger.

2. The vehicular display control apparatus according to claim 1, wherein:
   the speed difference determination portion determines the speed difference before establishment of a forced speed reduction condition based on which a forced speed reduction unit of the subject vehicle forcedly reduces the traveling speed to the speed limit or lower.

3. The vehicular display control apparatus according to claim 1, wherein:
   the switching control portion expands the speed display to provide the emphasized display.

4. The vehicular display control apparatus according to claim 3, wherein:
   the switching control portion expands the speed display toward a driver seat of the subject vehicle to provide the emphasized display.

5. The vehicular display control apparatus according to claim 3, wherein:
   the switching control portion expands the speed display indicating both the traveling speed and the speed limit on the display unit to provide the emphasized display.

6. The vehicular display control apparatus according to claim 1, wherein:
   the condition determination portion determines whether the deviation prediction condition has been established, the deviation prediction condition being a condition that the traveling road is switched to an ordinary road from a highway allowing higher legal maximum speed than a legal maximum speed of the ordinary road.

7. The vehicular display control apparatus according to claim 1, wherein:
   the condition determination portion determines whether the deviation prediction condition has been established, the deviation prediction condition being a condition that the traveling road is switched from an outside of a tunnel to an inside of the tunnel.

8. The vehicular display control apparatus according to claim 1, wherein:
   the condition determination portion determines whether the deviation prediction condition has been established, the deviation prediction condition being a condition that the traveling road is a slope.

9. The vehicular display control apparatus according to claim 1, wherein:
   the condition determination portion determines whether the deviation prediction condition has been established, the deviation prediction condition being a condition that a traveling time zone of the subject vehicle is a night time.

10. The vehicular display control apparatus according to claim 1, wherein:
    the speed difference determination portion determines whether the speed difference is equal to an end determination value or smaller; and
    the switching control portion ends the emphasized display when the speed difference determination portion determines that the speed difference is equal to the end determination value or smaller.

11. The vehicular display control apparatus according to claim 1, wherein:
    the condition determination portion determines whether a cancellation prediction condition has been established, the cancellation prediction condition being a condition based on which cancellation of the deviation between the sensible speed and the traveling speed is predicted; and
    the switching control portion ends the emphasized display when the condition determination portion determines that the cancellation prediction condition has been established.

12. The vehicular display control apparatus according to claim 1, wherein:
    the condition determination portion determines whether a cancellation prediction condition has been established, the cancellation prediction condition being a condition based on which cancellation of the deviation between the sensible speed and the traveling speed is predicted;
    the speed difference determination portion determines whether the speed difference is equal to an end determination value or smaller; and
    the switching control portion ends the emphasized display in a case when the condition determination portion determines that the cancellation prediction condition has been established, and also when the speed difference determination portion determines that the speed difference is equal to the end determination value or smaller.

13. The vehicular display control apparatus according to claim 11, wherein:
    the condition determination portion determines whether the cancellation prediction condition has been established, the cancellation prediction condition being a condition that a cancellation prediction time predicted as a necessary time for cancellation of the deviation elapses from establishment of the deviation prediction condition.

14. The vehicular display control apparatus according to claim 11, wherein:
    the condition determination portion determines whether the cancellation prediction condition has been established, the cancellation prediction condition being a condition that a followability of a traveling state of the subject vehicle to a traveling flow of a different vehicle is achieved after establishment of the deviation prediction condition.

15. The vehicular display control apparatus according to claim 11, wherein:
the condition determination portion determines whether the cancellation prediction condition has been established, the cancellation prediction condition being a condition that the subject vehicle temporarily stops after establishment of the deviation prediction condition.

16. A vehicular display control method for controlling display produced by a display unit of a subject vehicle, the vehicular display control method comprising:
determining whether a deviation prediction condition has been established for the subject vehicle, the deviation prediction condition being a condition based on which a deviation between a sensible speed for a driver and an actual traveling speed is predicted;
determining whether a speed difference between the actual traveling speed and a speed limit designated for a traveling road on which the subject vehicle travels becomes a switching determination value or larger, and whether a shortage of the traveling speed from the speed limit is equal to the switching determination value or larger; and
switching a speed display indicating the traveling speed and displayed by the display unit to an emphasized display emphasizing the speed display in a case when it is determined that the deviation prediction condition has been established, and also when it is determined that the speed difference is equal to the switching determination value or larger.

* * * * *